United States Patent [19]

Lentz et al.

[11] 3,773,162

[45] Nov. 20, 1973

[54] DOCUMENT CARD TRANSPORT MECHANISM

[75] Inventors: Robert C. Lentz, Rochester, Minn.; Royal K. Turley, Morgan Hill, Calif.

[73] Assignee: International Business Machines Corporation, Armonk, N.Y.

[22] Filed: Nov. 5, 1971

[21] Appl. No.: 195,959

[52] U.S. Cl. ............... 197/127 R, 197/135, 271/58, 235/61.9 A

[51] Int. Cl. ......................... B41j 13/32, B41j 13/12

[58] Field of Search ........................... 117/127, 135; 235/61.9 A; 271/49, 52, 59, 48, 58; 197/130

[56] References Cited

UNITED STATES PATENTS

| | | | |
|---|---|---|---|
| 3,000,487 | 9/1961 | Friedrichsen | 197/135 R X |
| 3,015,486 | 1/1962 | Weidenhammer | 271/58 |
| 3,116,961 | 1/1964 | Wax | 101/93 C X |
| 3,131,931 | 5/1964 | Fechkowsky | 271/58 X |
| 3,168,309 | 2/1965 | Schopp et al. | 271/58 |
| 3,401,782 | 9/1968 | Shepard | 197/127 R X |
| 3,614,091 | 10/1971 | Bernardis | 271/52 |
| 3,666,262 | 5/1972 | Fowler et al. | 271/52 |

*Primary Examiner*—Edgar S. Burr
*Attorney*—Keith T. Bleuer et al.

[57] ABSTRACT

Apparatus for changing the position of a document card so that it may be printed in a plurality of print positions and in a plurality of print rows including card engaging segments disposed on the ends of flexible arms, a solenoid for flexing the arms so as to increment the card forwardly, and a stepper motor for incrementally rotating the segments so as to step the card transversely.

11 Claims, 6 Drawing Figures

INVENTORS.
ROBERT C. LENTZ
ROYAL K. TURLEY
BY
Keith T. Bleuer
ATTORNEY

DOCUMENT CARD TRANSPORT MECHANISM

BACKGROUND OF THE INVENTION

The invention relates to document cards and more particularly to mechanism for printing document cards.

It has previously been proposed to print a document card in at least three print lines, with each of the print lines comprising a plurality of print positions, by means of a sidewardly moving carriage. The carriage carried a pair of incrementally rotative feed rolls for gripping the document card, and the carriage and feed rolls initially held the document card with a first line of print disposed above rotating print wheels. The print wheels were so spaced that alternate print positions in the first line were intially printed. The carriage then was incremented sideways to a second position with no rotative movement of the feed rolls so as to put the intermediate print positions in the first line of print in alignment with the print wheels, and these positions were then printed to complete the line of print. The carriage was then moved back again to its initial position and at the same time the feed rolls were incremented so as to move alternate positions of a second line of print into alignment with the print wheels, and these positions were printed. The carriage was then again moved sidewardly to its second position, with no incremental movement of the rolls at this time, and the intermediate print positions in the second print line were then in alignment with the print wheels and these positions were printed. A third line of print was printed in the same manner as the second print line, with the same movements of the carriage and feed rolls occurring as for the second line.

SUMMARY OF THE INVENTION

It is an object of the present invention to provide an improved simplified mechanism for moving a document card from an initial position to various other positions over rotating print wheels so that the print wheels may be used to first print alternate characters in a print line, then print the intermediate other characters in the print line to complete the print line and print second and third print lines similarly, the general movement of the document card being quite similar to that provided by the prior structure just above described but with simplified and more economically manufactured card moving mechanism.

In brief, the improved document card moving mechanism of the invention in a preferred form comprises a pair of segments gripping the document card between the segments and a pair of pressure rolls. The segments are provided on the ends of spring arms, and a solenoid is provided for bending the arms so as to move the document card to alternate print positions in a first line of print. A stepper motor rotates the spring arms and the segments slightly so as to move the card, with accompanying rotation of the pressure rolls, from a first print line position to a second print line position, and additional print positions are printed utilizing the solenoid for bending the spring arms and the stepper motor for incrementally rotating the segments for moving the document card in directions at 90 degrees to each other.

DESCRIPTION OF THE PREFERRED EMBODIMENT

Figure 1:
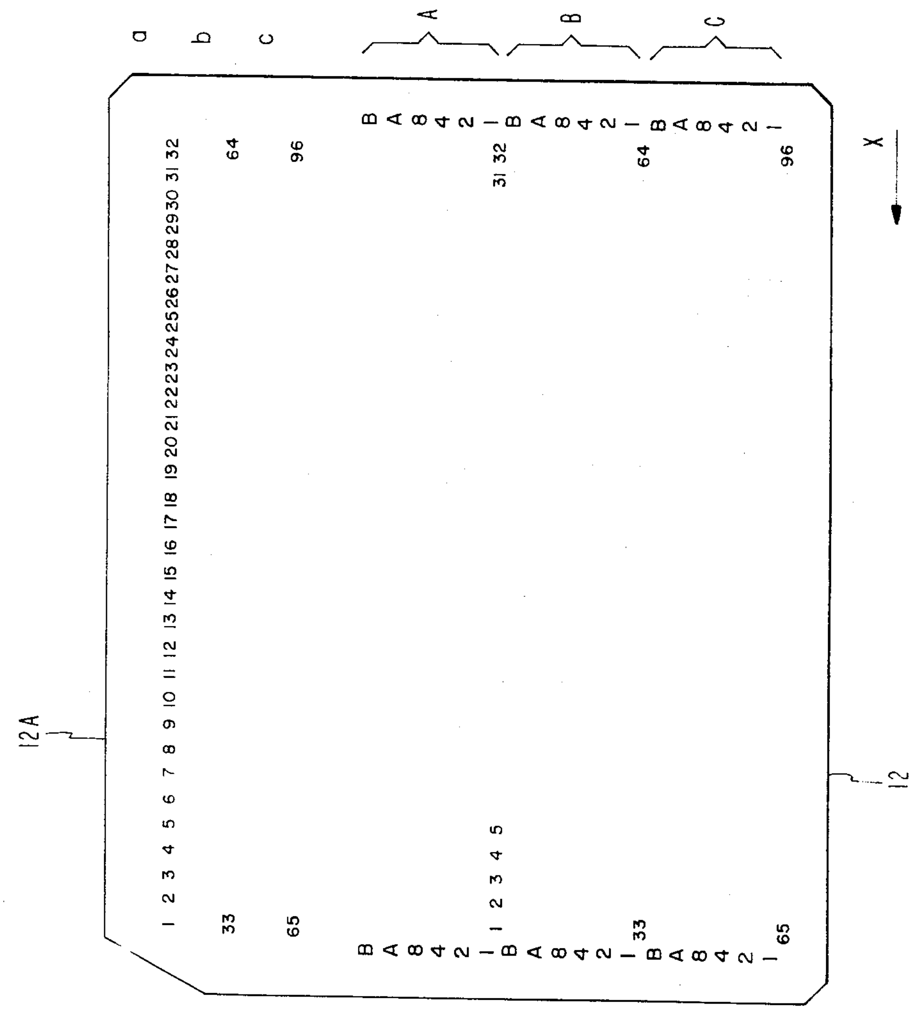
FIG. 1 is a plan view of a document card which may be printed utilizing the card printing and transport mechanism of the invention.

Referring now to the drawings, the illustrated document card printing and transport mechanism may be seen to comprise, in general, a roll pair 10 for initially moving a document card 12 toward its printing position, a card inject-eject roll pair 14 for moving the card 12 just prior to and just subsequent to printing, a final roll pair 16 for moving the card after printing has been completed, a plurality of print wheels 18, a plurality of print hammers 20 corresponding to the wheels 18, a card gate 22 for holding the card 12 in an initial printing position, a pair of card clamping rolls 24 and 25, and segments 26 and 27 which co-act with the rolls 24 and 25 for moving the card after initial printing has taken place.

The document card 12 is of the type which may be punched with three tiers A, B, and C of punchings in a lower portion of the card, with, for example, 32 columns of punchings in the uppermost tier A, punched columns 33 – 64 in the middle tier B, and punched columns 65 – 96 in the lowermost tier C. The uppermost portion of the card 12 may be printed in three rows *a*, *b*, and *c*, with thirty-two characters being printed in the uppermost row *a* corresponding to columns 1 – 32 of punchings in tier A, with an additional 32 characters being printed in the middle row *b* corresponding to the punchings in the middle tier B, and with an additional 32 characters printed in the third row *c* corresponding to the punchings in the lowermost tier C. The printing mechanism of the present invention is intended particularly to accomplish the printing in the rows *a*, *b*, and *c*, and the punching in the tiers A, B, and C may be accomplished by any suitable punching mechanism not herein disclosed.

The roll pair 10 includes a feed roll 28 and a coacting pressure roll 30 for moving a card 12 toward its printing position by gripping the card between rolls 28 and 30. The final rolls 16 include a feed roll 32 and a pressure roll 34, and a transport belt 36 passes over the roll 32. The card 12 is gripped between the belt 36 and roll 34 for moving it after printing is accomplished.

There may be sixteen of the print wheels 18, and these wheels 18 are fixed in spaced relationship on a shaft 38 which is rotatably disposed in a frame 40. The shaft 38 and thereby the print wheels 18 may be driven from any suitable power source. One of the print hammers 20 is disposed above each of the print wheels 18, and a hammer 20 is actuated as by a magnet 42 and push rod 43 so as to make impact on the card 12, with the card being in printing position over the print wheels 18, at the proper time so as to cause a desired one of the characters on the periphery of the corresponding print wheel 18 to be imprinted on the under face of the card 12. Any suitable well-known circuitry may be used for actuating the magnets 42 for the hammers 20 to cause hammers 20 to print the proper characters on the under face of the card 12, and this circuitry may be under the control of a pair of magnetic emitters 44 and 46 which have electric pulses instilled in them as shaft 38 rotates.

The frame 40 is provided with a flat surface or card bed 48 over which the card 12 moves, and a registration rail 50 is provided along an edge of bed 48. The card 12 is adapted to have its edge 12A, which may be termed a registration edge, in contact with the rail 50 as the card moves over the bed 48 in the direction X, with the card face on which printing is accomplished being down.

The gate 22 stops the card 12 in an initial printing position, and the gate is pivotally mounted on a shaft 52. An electromagnet 54 is provided for moving the gate 22 into contact with bed 48, and a spring 56 is provided for moving the gate 22 off the bed 48 when the electromagnet 54 is de-energized.

The rolls 24 and 25 are fixed on a shaft 58 that is rotatably disposed in a carriage arm 60 swingably mounted on a pivot shaft 62. The shaft 58 is considerably longer than the carriage arm 60, and a spring 64 is provided between the roll 24 and an end of the carriage arm 60. An electromagnet 66 is provided for swinging carriage arm 60 about its pivot shaft 62 so as to move rolls 24 and 25 upwardly when electromagnet 66 is energized.

The roll pair 14 comprises a feed roll 70 and a pressure roll 72. The feed roll 70 is constantly driven and is axially fixed with respect to the frame 40, and roll 72 is movable toward and away from the roll 70 by the electromagnet 66 which as just described is also operative for moving rolls 24 and 25. The roll 72 is mounted on a pressure roll arm 74 which is pivoted on a pivot shaft 76 fixed in frame 40. A retraction spring 78 is effective for holding roll 72 retracted from nipped relationship with roll 70 and extends between a fixed pin 79 and a pin 80 fixed in arm 74. A spring 81 connects carriage arm 60 with arm 74 by means of pin 80 and a bracket 82 fixed to carriage arm 60 so that when electromagnet 66 is energized, arm 74 is swung about its pivot shaft 76 to move roll 72 into nipped relationship with roll 70. In this action, spring 81 overcomes spring 78.

Figure 3:
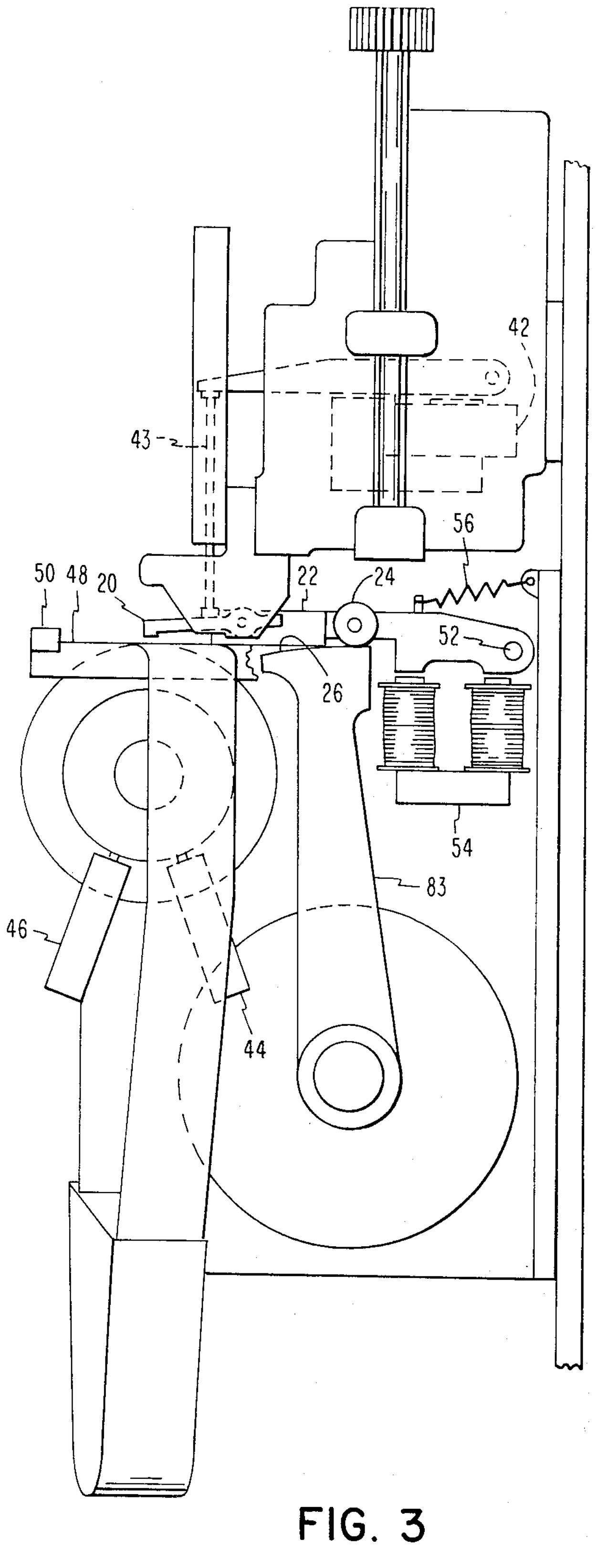
FIG. 3 is a side elevational view of the card printing and transport mechanism and taken from line 3—3 of FIG. 2.
Figure 4:
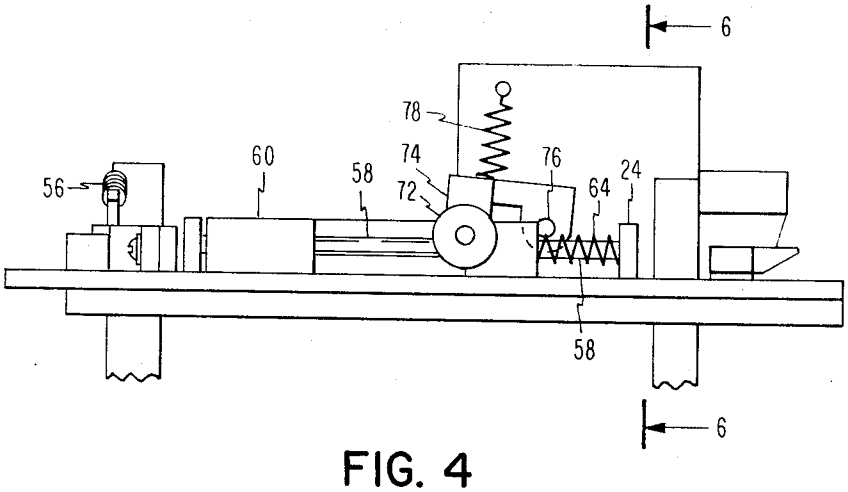
FIG. 4 is a partial front elevational view of the mechanism taken on an enlarged scale.
Figure 5:
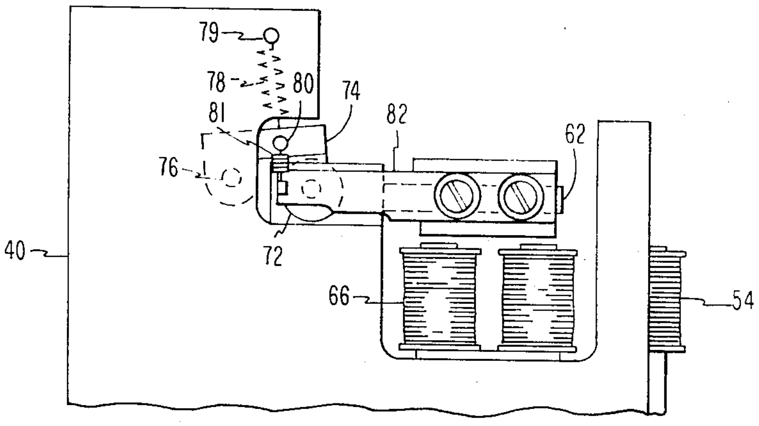
FIG. 5 is a partial rear elevational view of the mechanism.
Figure 6:
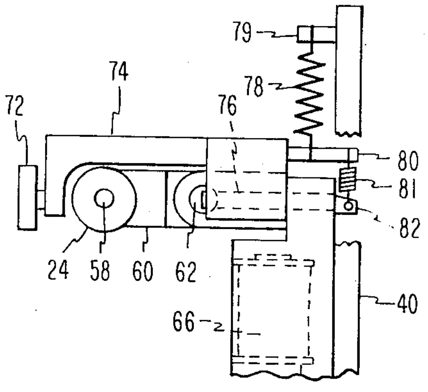
FIG. 6 is a partial side view taken on line 6—6 of FIG. 4.

The segments 26 and 27 are formed on the ends of arms 83 and 84 which extend from and are fixed to a shaft 86. The arms 83 and 84 are of thin spring material, but the arms are relatively wide as may be seen from FIG. 3. The arms 83 and 84 are thus quite rigid in the direction of their widths but are quite flexible in the direction in which the shaft 86 extends. The shaft 86 is connected to a stepper motor 88 which is operative when suitably energized for rotating shaft 86 through a small angle. The arms 83 and 84 are spaced the same distance apart along shaft 86 as the distance the rolls 24 and 25 are spaced on their shaft 58 so that the segments 26 and 27 are in alignment with the rolls 24 and 25, respectively.

The arms 83 and 84 are bent by the action of a solenoid 90 so as to thereby move the segments 26 and 27 and also the rolls 24 and 25, as will be hereinafter described in greater detail. The solenoid 90 is effective on a lever 92 carrying a roller 94 on its end, and the roller 94 is effective on the upper end of the arm 84.

An inked print ribbon 96 is arranged to pass over the print wheels 18 and beneath the corresponding print hammers 20. The ribbon 96 is incremented or driven as printing takes place by an suitable conventional ribbon driving mechanism.

In operation, the document card 12 passes between the rolls 28 and 30 and is moved thereby on to the bed 48 while having its registration edge 12A in contact with the registration rail 50 which thereby holds the card 12 in proper position on bed 48. The solenoid 66 is in energized condition so that the roll 72 is held in nipped relationship with respect to the feed roll 70 due to the action of the spring 81. The roll 70 co-acts with the roll 72 in moving the card 12 into contact with the gate 22 which thus holds the card 12 in a first printing position. In this position, the hammers 20 are in alignment with print positions 65, 67, 69, 71, etc. in print line *c;* and, therefore, when the proper characters on the wheels 18 appear in alignment with the hammers 20, the hammers print these characters on the lower face of the card 12 in these print positions, the magnets 42 having been previously energized at the proper times. The face of the card as shown in FIG. 1 on which the printing is accomplished faces down to accomplish this printing.

Figure 2:
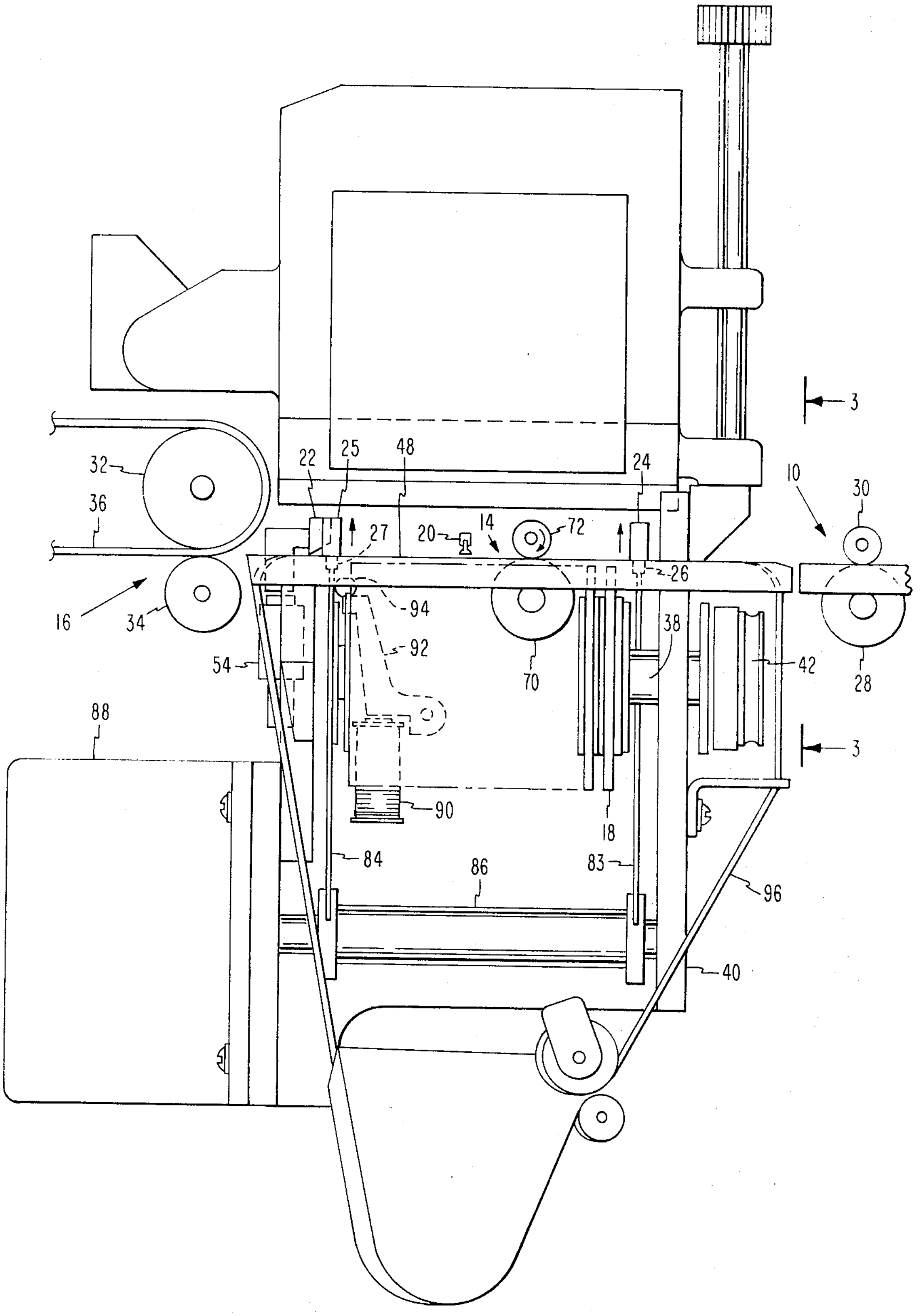
FIG. 2 is a front elevational view of the card printing and transport mechanism.

While the card 12 is in its first printing position just described, the solenoid 66 is de-energized; and the rolls 24 and 25 are thereby moved downwardly under the action of the springs 78 and 81 so that the card 12 is gripped between the segments 26 and 27 and the rolls 24 and 25 in this first printing position. The roll 72 is also raised out of contact with the card 12 by de-energization of the solenoid 66, and the gate 22 is raised by de-energization of electromagnet 54. After the printing has been finished in this printing position, solenoid 90 is energized; and the spring arm 84 is thus bent slightly under the action of the lever 92 and roll 94, so as to move the segment 27 on the end of the arm 84 and thereby the rolls 25 and 24 and shaft 58 to the left as seen in FIG. 2. At the same time, the segment 26 on the end of the arm 83 moves accordingly so that it remains in alignment with the roll 24 above it. The card 12 moves along with the segments 26 and 27 and the rolls 24 and 25 so that the card 12 is now in its second printing position wherein printing positions 66, 68, 70, 72, 74, etc. in print row *c* are in registry with and immediately above corresponding print wheels 18. There is substantial friction between the card 12, the rolls 24 and 25 (which may be of urethane having a substantial coefficient of friction) and the segments 26 and 27 so that, as the card 12 is moved into its second printing position, the two segments 26 and 27 and the two rolls 24 and 25 all move together, with the rolls 24 and 25 remaining in the same coinciding relationship with the segments 26 and 27 that previously existed when the card 12 was in its first printing position. When the card 12 is in its second printing position, the hammers 20 are again actuated at the proper times so that the proper characters are printed in print positions 66, 68, 70, etc.

After the printing in the second printing position of card 12 has been completed, the solenoid 90 is de-energized so that the arms 83 and 84 return to their initial straight unflexed dispositions; and the segments 26 and 27 and rolls 24 and 25 move back to their initial positions, carrying the card 12 back into its previous position in the X direction. At the same time, the stepper motor 88 is energized so as to rotate the shaft 86 and arms 83 and 84 through a slight angle; and the card 12 is moved sidewardly on the bed 48 away from the registration rail by the rolling action between segments 26 and 27 and rolls 24 and 25. The card 12 is now in its third printing position on the card bed 48 so that the print wheels 18 are in alignment with print positions 33, 35, 37, 39, etc. in the middle print row *b*. The hammers 20 are again actuated at the proper times to cause the proper characters to be printed in print positions 33, 35, 37, etc.

After the third printing action has thus been completed, the solenoid 90 is again energized so as to shift the card slightly in the direction X into the fourth printing position of the card; and, in this position, columns 34, 36, 38, 40, etc. of print row *b* are in alignment with the print wheels 18. The hammers 20 are again then actuated as before for printing the proper characters in these print positions.

Subsequently, the solenoid 90 is again de-energized, and the stepper motor 88 is energized. The arms 83 and 84 and wheels 24 and 25 move back into their initial positions, moving the card backwardly slightly; and the stepper motor 88 causes the card 12 to move a step farther away from the registration rail 50, so that the card 12 is in its fifth printing position in which the hammers 20 are aligned with print positions 1, 3, 5, 7, 9, etc. in print row *a*. Printing is completed as before, and subsequently solenoid 90 is again energized so as to move card 12 slightly in the forward direction X so as to place the card in its sixth printing position in which the hammers 20 are in alignment with print positions 2, 4, 6, 8, etc. of print row *a*. Printing is completed in this position of card 12 in the same manner as has been described for the other positions of the card 12.

After printing has been completed in all six printing positions of the card 12, the stepper motor 88 is reversed so as to move card 12 back in contact with rail 50. The solenoid 66 is then energized; and the roll 72 is moved into nipped relationship with respect to roll 70. The gate 22 is still held off the bed 48, and the card 12 on which printing has been completed is then moved by rolls 70 and 72 between the rolls 32 and 34. The latter rolls and belt 36 propel the card forwardly to any suitable stacker or card receiver.

The arrangement of the spring arms 83 and 84, the segments 26 and 27, the rolls 24 and 25 that move with the segments both axially and in rotation, together with the actuator (including solenoid 90) for the arms 83 and 84 constitutes a simple mechanism for controlling a document card so that it may be printed a plurality of times in a plurality of print rows. Although this document card and transporting arrangement has been described only in conjunction with the print wheels 18, it is apparent that this transporting arrangement could also be used with means for otherwise acting on a document card, such as for example, punches respectively taking the place of the print hammers 20.

We claim:

1. Mechanism for processing document cards comprising:

a row of operators for operating on a document card at a plurality of spaced positions along a predetermined line on the card when the card is in a certain position in registry with said operators, means for gripping said card and holding it in said position and including a flexible arm and a pressure member disposed opposite the end of the arm for gripping the card between them, an actuator effective on said arm to flex the arm so as to cause said card to move in the direction of said predetermined line so that said operators may operate at intermediate positions along said line, and means for rotating said arm through a small angle in the direction at right angles to the direction of its movement caused by said actuator so as to move the document card in a direction at right angles to said predetermined line whereby said operators may operate on the document card in a second predetermined line which is parallel to said first-named predetermined line.

2. Mechanism for processing document cards as set forth in claim 1, said row of operators including a row of print wheels at one face of said card and a row of print hammers at the other face of said card and in registry with said print wheels.

3. Mechanism for processing document cards as set forth in claim 1, said flexible arm being of sheet material extending in the direction of rotation of said arm.

4. Mechanism for processing document cards as set forth in claim 1, said card gripping means also including a second flexible arm which is coaxially disposed with respect to and is rotatable along with said first-named flexible arm, said pressure member constituting a roll disposed opposite said first-named flexible arm and said gripping means including a second roll disposed opposite said second-named flexible arm and coaxially disposed with respect to said first-named roll.

5. Mechanism for processing document cards as set forth in claim 4, said means for rotating said arms including a stepper motor for incrementing said arms through a plurality of small angled steps so that said operators are operative in a third predetermined line on the document card parallel with said first-named predetermined line.

6. Mechanism for processing document cards as set forth in claim 4 and including a pair of nipped rolls for moving the card into its said certain position and a gate for holding the card in its said certain position.

7. Mechanism for processing document cards as set forth in claim 6 and including means for mounting said two rolls disposed opposite said flexible arms so that they may be moved into and out of contact with the document card, means for movably mounting one of said nipped rolls so that it may be moved into and out of contact with the document card, and means for interconnecting said two mounting means so that said one nipped roll is moved out of contact with the document card while said two first-named rolls are moved into contact with the document card.

8. Mechanism for moving a document card in two different directions comprising:

an arm of flexible sheet material which is formed with a curved edge surface on one end of the arm, means for rotatably mounting said arm at its other end about an axis extending transversely of the sheet material of the arm, a pressure applying part opposite said curved edge surface of said arm for gripping the document card between said curved edge surface and said pressure applying part, means effective on said arm for flexing the arm in a direction extending transversely of the sheet material of the arm so as to move the document card from one position to another position in a first one of said directions while the card is gripped between the arm and said pressure applying part, and means for rotating said arm through a small angle about its said axis of rotation so as to move the card in the other of said directions while the card is gripped between the arm and said pressure applying part.

9. Mechanism for moving a document card as set forth in claim 8, said pressure applying part including a roll, and means for mounting said roll so that the roll is rotatable and is moveable axially of the roll so as to allow the card to be moved in said two directions.

10. Mechanism for moving a document card as set forth in claim 9 and including means for moving the document card initially in the direction of the axis of said roll, and a gate for holding the card in a position between said roll and said curved edge surface of said arm so that said flexible sheet material arm may move the document card in said two directions.

11. Mechanism for moving a document card as set forth in claim 9 and including a pair of rolls for initially propelling the card in the direction parallel with respect to the axis of said first named roll, means for moving one of the rolls of said roll pair away from the other roll of said roll pair for rendering the roll pair inoperative to propel the document card, means for moving said first named roll toward and away from said curved arm edge surface, and means for interconnecting said two roll moving means so that one of said rolls of said roll pair is moved away from the other roll of said roll pair when said first named roll is moved toward said curved arm surface.

* * * * *